(12) United States Patent
Dauber et al.

(10) Patent No.: US 11,989,085 B2
(45) Date of Patent: May 21, 2024

(54) INTELLIGENT WORKFLOW FOR END-OF-SUPPORT SOLUTION ADVISOR

(71) Applicant: International Business Machines Corporation, Armonk, NY (US)

(72) Inventors: Melanie Dauber, Oceanside, NY (US); Jaclyn Rudolf, Bellmore, NY (US); Zachary A. Silverstein, Georgetown, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 17/656,689

(22) Filed: Mar. 28, 2022

(65) Prior Publication Data
US 2023/0305916 A1    Sep. 28, 2023

(51) Int. Cl.
| | |
|---|---|
| G06F 11/00 | (2006.01) |
| G06F 8/65 | (2018.01) |
| G06F 11/07 | (2006.01) |
| G06F 11/30 | (2006.01) |
| G06F 11/32 | (2006.01) |

(52) U.S. Cl.
CPC ............ *G06F 11/0793* (2013.01); *G06F 8/65* (2013.01); *G06F 11/3006* (2013.01); *G06F 11/327* (2013.01)

(58) Field of Classification Search
CPC . G06F 11/0793; G06F 11/3006; G06F 11/327
USPC ...................................................... 714/1–57
See application file for complete search history.

(56) References Cited

U.S. PATENT DOCUMENTS

| | | | |
|---|---|---|---|
| 7,702,497 B2 * | 4/2010 | Dombrowski | G06Q 30/06 703/22 |
| 8,205,122 B1 * | 6/2012 | Leverich | G06F 11/3409 714/47.1 |
| 8,612,577 B2 | 12/2013 | Ferris | |
| 8,881,136 B2 * | 11/2014 | DeJana | G06F 8/65 709/201 |
| 9,438,498 B2 | 9/2016 | Yoshikawa | |

(Continued)

OTHER PUBLICATIONS

IBM, "Buy or upgrade warranty and maintenance for IBM hardware and software", IBM, Accessed Mar. 15, 2022, 9 Pages.
(Continued)

*Primary Examiner* — Sarai E Butler
(74) *Attorney, Agent, or Firm* — Stephanie Carusillo

(57) ABSTRACT

In an approach for predicting an optimal system upgrade, a processor detects an upgrade is available for a system of a first user computing device. A processor gathers a set of live data from an environment of the first user computing device using a process mining software. A processor compares the set of live data to a set of historical data stored in a knowledge corpus to identify a second user computing device similar to the first user computing device. Responsive to identifying the second user computing device, a processor performs a pattern recognition to generate one or more critical recommendations associated with the upgrade for the system of the first user computing device. A processor schedules the upgrade for the system of the first user computing device during a period of time, wherein the period of time is scheduled consistent with the one or more critical recommendations.

20 Claims, 3 Drawing Sheets

(56) References Cited

U.S. PATENT DOCUMENTS

| 9,455,871 | B1 | 9/2016 | Chheda |
| 9,519,474 | B2 | 12/2016 | Kurian |
| 10,061,611 | B2 | 8/2018 | Tarasuk-Levin |
| 10,977,231 | B2 | 4/2021 | Senthilnathan |
| 11,036,488 | B2* | 6/2021 | Marzorati .............. G06N 20/00 |
| 2019/0306236 | A1 | 10/2019 | Wiener |
| 2019/0324744 | A1* | 10/2019 | Alam ........................ G06F 8/31 |
| 2021/0185086 | A1* | 6/2021 | Zegeye ................ G06F 18/295 |
| 2021/0397428 | A1 | 12/2021 | Samuel |

OTHER PUBLICATIONS

IBM, "Upgrade planning", IBM Support, Accessed Mar. 15, 2022, 3 Pages.

* cited by examiner

INTELLIGENT WORKFLOW FOR END-OF-SUPPORT SOLUTION ADVISOR

BACKGROUND OF THE INVENTION

The present invention relates generally to the field of data processing, and more particularly to an intelligent workflow for an end-of-support solution advisor.

End-of-support marks the official withdrawal of technical support for a hardware product or a software product that has reached the end of its life cycle (i.e., the end-of-life). When a hardware product or a software product reaches its end-of-life, the hardware product or the software product will no longer receive updates because, from a vendor's point of view, the hardware product or the software product is at the end of its useful life. At this stage, the vendor stops marketing, selling, and provisioning parts, services, and updates for the hardware product or the software product. A user can continue to access an existing hardware product or software product, but the user will not receive security updates and technical support for the hardware product or the software product.

SUMMARY

Aspects of an embodiment of the present invention disclose a method, computer program product, and computer system for predicting an optimal system upgrade. A processor detects an upgrade is available for a system of a first user computing device. A processor gathers a set of live data from an environment of the first user computing device using a process mining software. A processor compares the set of live data from the environment of the first user computing device to a set of historical data stored in a knowledge corpus to identify a second user computing device similar to the first user computing device in terms of one or more factors. Responsive to identifying the second user computing device, a processor performs a pattern recognition between the set of live data from the environment of the first user computing device and the set of historical data stored in the knowledge corpus to generate one or more critical recommendations associated with the upgrade for the system of the first user computing device. A processor determines if a flow of traffic on the system of the first user computing device is at a higher risk of failure. Responsive to determining the flow of traffic through the system of the first user computing device is at the higher risk of failure, a processor sends an alert notification with the one or more critical recommendations to a user. A processor schedules the upgrade for the system of the first user computing device during a period of time, wherein the period of time is scheduled consistent with the one or more critical recommendations.

In some aspects of an embodiment of the present invention, prior to detecting the upgrade is available for the system of the first user computing device, a processor gathers a set of data about a state of the first user computing device. A processor identifies a version of the system of the first user computing device. A processor identifies an end-of-life support date of the system of the first user computing device. A processor correlates the version of the system of the first user computing device with the end-of-life support date of the system of the first user computing device.

In some aspects of an embodiment of the present invention, the set of data gathered from the first user computing device includes an identifying name of the first user computing device; a physical location of the first user computing device; an IP address for a network adapter of the first user computing device; a version of an operating system on the first user computing device; a version of a service pack on the first user computing device; a version of a hotfix on the first user computing device; a domain membership on the first user computing device; a type of hardware on the first user computing device; a role of the hardware; a type of software on the first user computing device; a role of the software; a type of middleware on the first user computing device; a role of the middleware; a type of network on the first user computing device; a role of the network; a set of upgrade processing data; a set of upgrade timing and duration data; a set of end-of-life support data; a set of data based on a usage, an interaction, and/or a dependency of the first user computing device; and a set of other critical behavior data.

In some aspects of an embodiment of the present invention, the set of historical data contains a plurality of historical system logs from one or more user computing devices that have already completed the upgrade that is available for the system of the first user computing device.

In some aspects of an embodiment of the present invention, the one or more factors include a similar type of hardware, a similar type of software, a similar type of middleware, a similar amount of memory unit in a storage unit, a similar processing ability, and a similar size.

In some aspects of an embodiment of the present invention, a processor gathers temporal data related to a minimum amount of time to upgrade the system, an average time to upgrade the system, a mean time to upgrade the system, and a maximum time to upgrade the system. A processor generates a predicted metric of downtime based on a result of the pattern recognition. A processor generates a list of risk factors associated with not upgrading the system of the first user computing device at a specific time, at a specific location, or at a specific part of the process.

In some aspects of an embodiment of the present invention, the one or more critical recommendations include an explanation of performance of the system of the first user computing device; a recommended time when the system of the first user computing device should be upgraded, wherein the recommended time is based on a predicted metric of downtime; a recommended timeline that should be followed when the system of the first user computing device is upgraded; and a list of risk factors associated with not upgrading the system of the first user computing device at a specific time, at a specific location, or at a specific part of the process.

In some aspects of an embodiment of the present invention, a processor enables the user to input a what-if type of scenario. A processor processes the what-if type of scenario to identify one or more changing variables. A processor learns a logical progression of upgrades from the what-if type of scenario.

These and other features and advantages of the present invention will be described in, or will become apparent to those of ordinary skill in the art in view of, the following detailed description of the example embodiments of the present invention.

DETAILED DESCRIPTION

Embodiments of the present invention recognize that users of computing devices often run complex solutions with a plurality of combinations of hardware and software from more than one vendor. These users may find it difficult to maintain version upgrades and to stay up to date with end-of-life support lifecycles because of the complexities of their environment. As a result, these users may run unsupported versions of hardware and software and, when finally upgrading, may have lengthy and complicated upgrades.

Therefore, embodiments of the present invention recognize the need for a proactive system and method to monitor for and alert a user of an end-of-life support lifecycle of a piece of hardware, a piece of software, a piece of middleware, and/or a network running on the user's computing device; to predict an optimal upgrade, migration, and/or patch for the user's computing device; and to outline one or more critical recommendations the user should know when performing the upgrade, migration, and/or patch, including an estimated amount of time the upgrade, migration, and/or patch should take to complete and a list of activities that should be completed in order for the hardware, software, middleware, and/or network of the user's computing device to be compliant and for the functionality, usability, and/or performance of the user's computing device to be improved. The present invention may be applicable to both combinations of traditional on-prem systems, as well as containerized systems that require upgrade dependencies.

Embodiments of the present invention provide a system and method to predict an optimal upgrade, migration, and/or patch for a piece of hardware, a piece of software, a piece of middleware, and/or a network at or near an end-of-support lifecycle.

Implementation of embodiments of the present invention may take a variety of forms, and exemplary implementation details are discussed subsequently with reference to the Figures.

Figure 1:
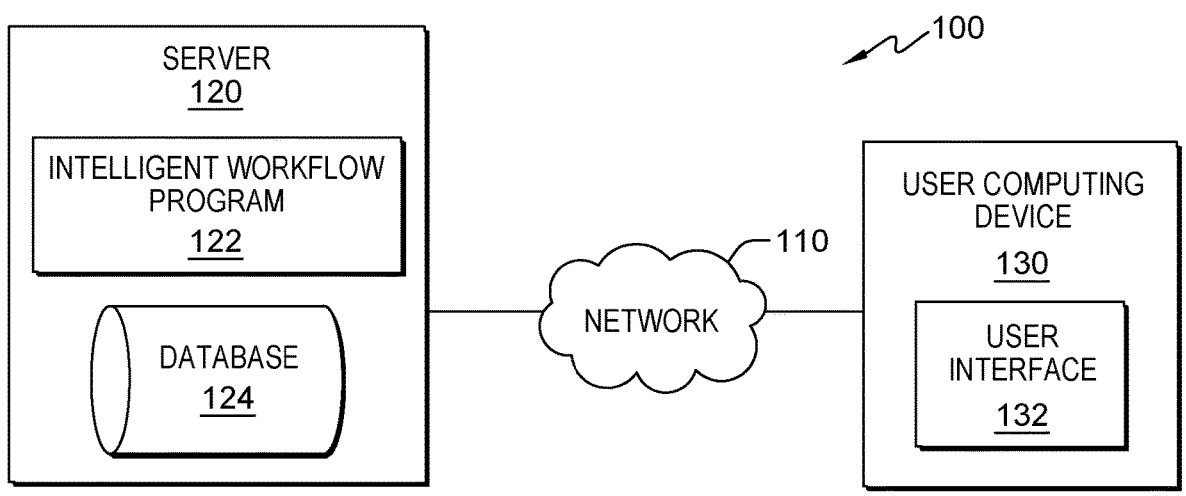
FIG. 1 is a block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, and other computing devices (not shown) within distributed data processing environment 100.

Server 120 operates to run intelligent workflow program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 3.

Intelligent workflow program 122 operates to predict an optimal upgrade, migration, and/or patch for a piece of hardware, a piece of software, a piece of middleware, and/or a network at or near an end-of-support lifecycle. In the depicted embodiment, intelligent workflow program 122 is a standalone program. In another embodiment, intelligent workflow program 122 may be integrated into another software product, such as any software that may require an upgrade, a migration, and/or a patch. In the depicted embodiment, intelligent workflow program 122 resides on server 120. In another embodiment, intelligent workflow program 122 may reside on user computing device 130 or on another computing device (not shown), provided that intelligent workflow program 122 has access to network 110.

In an embodiment, the user of user computing device 130 registers with server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via intelligent workflow program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124. The operational steps of intelligent workflow program 122 are depicted and described in further detail with respect to FIG. 2.

Database 124 operates as a repository for data received, used, and/or generated by intelligent workflow program 122. A database is an organized collection of data. Data includes, but is not limited to, information about user preferences (e.g., general user system settings such as alert notifications for user computing device 130); information about alert notification preferences; a set of data gathered from the user computing device (e.g., an identifying name of the first user computing device; a physical location of the first user computing device; an IP address for a network adapter of the first user computing device; a version of an operating system on the first user computing device; a version of a service pack on the first user computing device (i.e., a collection of updates, fixes, or enhancements to an operating system or a software program delivered in the form of a single installable package); a version of a hotfix on the first user computing device; a domain membership on the first user computing device; a type of hardware on the first user computing device; a role of the hardware; a type of software on the first user computing device; a role of the software; a type of middleware on the first user computing device; a role of the middleware; a type of network on the first user computing device; a role of the network; a set of upgrade processing data; a set of upgrade timing and duration data; a set of end-of-life support data; a set of data based on a usage, an interaction, and/or a dependency of the user computing device; and a set of other critical behavior data); a set of historical data (e.g., a plurality of historical systems and/or network logs from one or more user computing devices that have already completed the upgrade, migration, and/or patch that is available for the system and/or network of the first user computing device); the one or more critical recommendations; feedback received from the user; feedback gathered from the first user computing device; and any other data received, used, and/or generated by intelligent workflow program 122.

Database 124 can be implemented with any type of device capable of storing data and configuration files that can be accessed and utilized by server 120, such as a hard disk drive, a database server, or a flash memory. In an embodiment, database 124 is accessed by intelligent workflow program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that intelligent workflow program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Intelligent workflow program 122 enables the authorized and secure processing of personal data.

Intelligent workflow program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Intelligent workflow program 122 provides information regarding personal and/or confidential data and the nature (e.g., type, scope, purpose, duration, etc.) of the processing. Intelligent workflow program 122 provides the user with copies of stored personal and/or confidential company data. Intelligent workflow program 122 allows the correction or completion of incorrect or incomplete personal and/or confidential data. Intelligent workflow program 122 allows for the immediate deletion of personal and/or confidential data.

User computing device 130 operates to run user interface 132 through which a user can interact with intelligent workflow program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with intelligent workflow program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132.

User interface 132 operates as a local user interface between intelligent workflow program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from intelligent workflow program 122 to a user via network 110. User interface 132 can also display or present alerts including information (such as graphics, text, and/or sound) sent from intelligent workflow program 122 to a user via network 110. In an embodiment, user interface 132 is capable of sending and receiving data (i.e., to and from intelligent workflow program 122 via network 110, respectively). Through user interface 132, a user can opt-in to intelligent workflow program 122; create a user profile; set user preferences and alert notification preferences; receive an alert notification; provide input on when and how to upgrade the system and/or network of the first user computing device; receive a request for feedback regarding the upgrade of the system and/or network of the first user computing device; input feedback; and input a what-if type of scenario.

A user preference is a setting that can be customized for a particular user. A set of default user preferences are assigned to each user of intelligent workflow program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of intelligent workflow program 122; information learned from feedback input by the user regarding the upgrade of the system and/or network of the first user computing device (e.g., positive and negative feedback regarding an experience had while upgrading the system and/or network of the first user computing device as well as successes and failures of the upgrade of the system and/or network of the first user computing device); information learned from feedback gathered from the user computing device (e.g., chronological dates as well as successes and failures of the plan to upgrade of the system and/or network of the first user computing device); and information learned from the what-if type of scenarios input by the user (e.g., the logical progression of upgrades and whether to be more or less aggressive with the upgrades).

Figure 2:
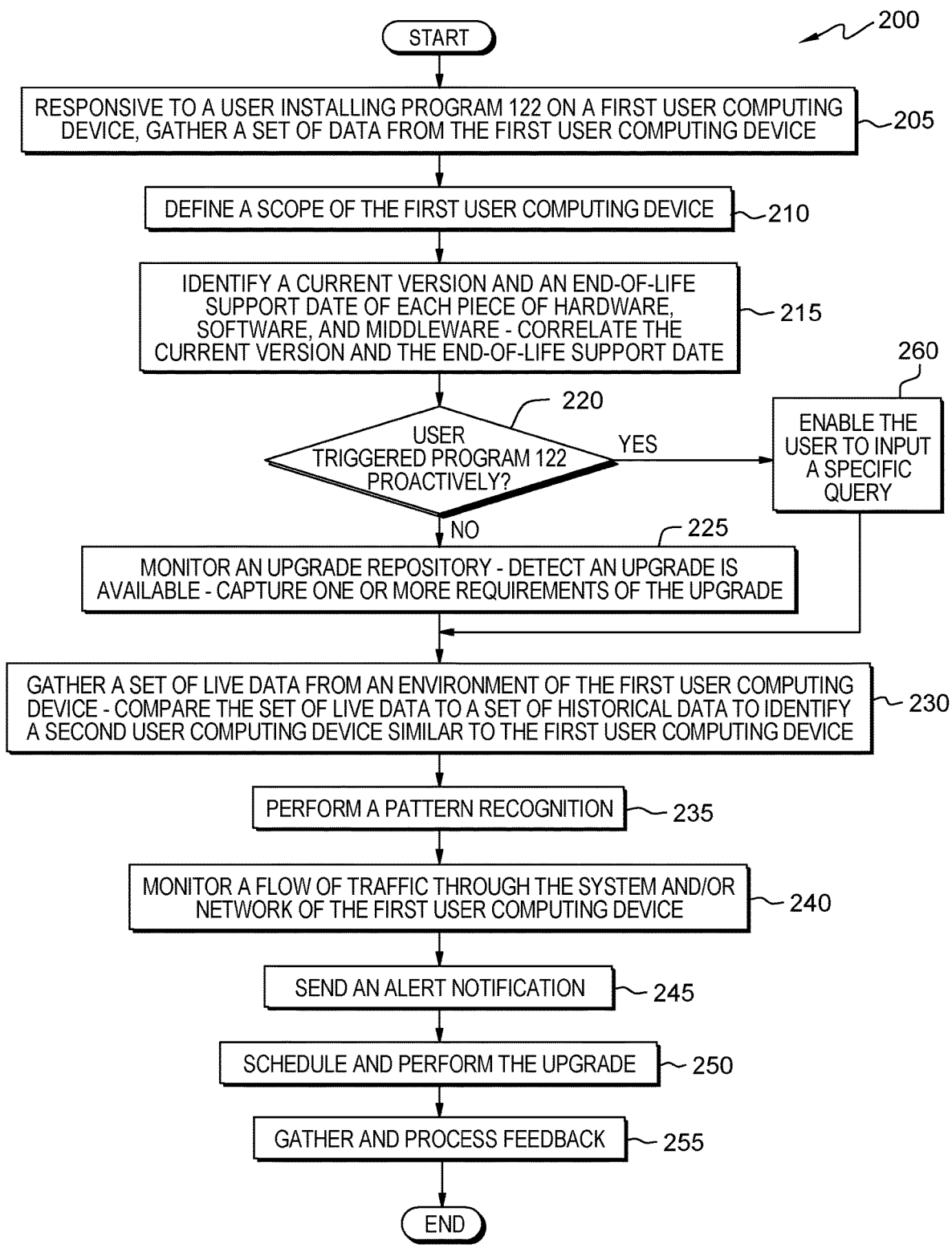
FIG. 2 is a flowchart illustrating the operational steps of an intelligent workflow program, on a server within the distributed data processing environment of FIG. 1, in accordance with an embodiment of the present invention.

FIG. 2 is a flowchart, generally designated 200, illustrating the operational steps of intelligent workflow program 122, on server 120 within distributed data processing environment 100 of FIG. 1, in accordance with an embodiment of the present invention. In an embodiment, intelligent workflow program 122 operates to predict an optimal upgrade, migration, and/or patch for a piece of hardware, a piece of software, a piece of middleware, and/or a network at or near an end-of-support lifecycle. It should be appreciated that the process depicted in FIG. 2 illustrates one possible iteration of the process flow, which may be repeated each time intelligent workflow program 122 detects an optimal upgrade, migration, and/or patch available for a first user computing device. The process depicted in FIG. 2 may also be repeated each time intelligent workflow program 122 is triggered by the user to search for an upgrade, migration, and/or patch for the first user computing device.

In step 205, responsive to a user installing intelligent workflow program 122 (hereinafter referred to as "program 122") on a first user computing device (e.g., user computing device 130), program 122 gathers a set of data from the first user computing device. In another embodiment, responsive to a user installing program 122 on more than one user computing device (e.g., a user installs program 122 on a laptop computer and a desktop computer), program 122 gathers a set of data from the more than one user computing device. In an embodiment, program 122 gathers a set of data about a current state of the first user computing device. In an embodiment, program 122 gathers a set of data from the first user computing device through a manual discovery method. In another embodiment, program 122 gathers a set of data from the first user computing device through an automated discovery method (e.g., an automated auditing network management system). In another embodiment, program 122 gathers a set of data from the first user computing device through a hybrid discovery method (i.e., through a manual discovery method and an automated discovery method).

The set of data gathered from the first user computing device may include, but is not limited to, an identifying name of the first user computing device; a physical location of the first user computing device; an IP address for a network adapter of the first user computing device; a version of an operating system on the first user computing device; a version of a service pack on the first user computing device (i.e., a collection of updates, fixes, or enhancements to an operating system or a software program delivered in the form of a single installable package); a version of a hotfix on the first user computing device; a domain membership on the first user computing device; a type of hardware on the first user computing device; a role of the hardware; a type of software on the first user computing device; a role of the software; a type of middleware on the first user computing device; a role of the middleware; a type of network on the first user computing device; a role of the network; a set of upgrade processing data; a set of upgrade timing and duration data; a set of end-of-life support data; a set of data based on a usage, an interaction, and/or a dependency of the user computing device; and a set of other critical behavior data. The set of data gathered from the first user computing device may include qualitative data and quantitative data. In an embodiment, program 122 consolidates the set of data gathered from the first user computing device into a knowledge corpus (e.g., database 124). In an embodiment, program 122 performs regular discovery efforts periodically in order to keep the data in the knowledge corpus current.

In step 210, program 122 defines a scope of the first user computing device using a holistic approach. In an embodiment, responsive to gathering a set of data from the first user computing device, program 122 defines a scope of the first user computing device using a holistic approach. Defining the scope of the first user computing device using the holistic approach may involve, but is not limited to, defining all of the pieces of hardware, all of the pieces of software, all of the pieces of middleware, and all of the network connections of the first user computing device and/or performing an end-to-end test of the software on the first user computing device. End-to-end testing is a method that tests an entire software product on the first user computing device from the beginning of the software product to the end of the software product to ensure the software product behaves as expected. End-to-end testing defines the software product's external dependencies and ensures all integrated pieces work together as expected. The main purpose of end-to-end testing is to test the software product from the end user's point of view by simulating a real user scenario and by validating the software product under test situations. End-to-end testing tests every operation that the software product can perform to determine how the software product communicates with hardware, network connectivity, external dependencies, databases, and other applications.

Defining the scope of the first user computing device may also involve, but is not limited to, determining one or more complexities of the first user computing device and/or determining one or more dependencies of the first user computing device. Dependencies model the runtime relationships among the various components of a distributed data processing environment, such as distributed data processing environment 100. There are several types of dependencies, including, but not limited to, transactional dependencies, service dependencies, internet protocol (IP) dependencies, system dependencies, and application to application dependencies. Transactional dependencies occur between application components, such as web servers, application servers, and databases. The dependent component issues a request to the provider component in order to perform a certain function. For example, a Java™ Database Connectivity (JDBC) connection from a Java 2 Platform, Enterprise Edition (Java EE) server to a database is a transactional dependency. Service dependencies occur between application components and infrastructure services, such as Domain Name System (DNS), Lightweight Directory Access Protocol (LDAP), and Network File System (NFS). The provider component is the infrastructure service, and the dependent component requests a system service from the provider component. For example, a request to map a DNS name to an IP address is a service dependency. IP dependencies occur between two computer systems or between an application server and a computer system. System dependencies occur between an application server and its host computer system. Application to application dependencies occur from one business application to another business application.

In step 215, program 122 identifies a current version of each piece of hardware, software, and/or middleware on the first user computing device using the data gathered from the first user computing device. In an embodiment, responsive to defining a scope of the first user computing device using a holistic approach, program 122 identifies a current version of each piece of hardware, software, and/or middleware on the first user computing device using the data gathered from the first user computing device. In an embodiment, program 122 identifies a current version of each piece of hardware on the first user computing device using the data gathered from the first user computing device. In an embodiment, program 122 identifies an end-of-life support date of each piece of hardware on the first user computing device using the data gathered from the first user computing device. In an embodiment, program 122 correlates the current version with the end-of-life support date of each piece of hardware on the first user computing device. In an embodiment, program 122 identifies a current version of each piece of software on the first user computing device using the data gathered from the first user computing device. In an embodiment, program 122 identifies an end-of-life support date of each piece of software on the first user computing device using the data gathered from the first user computing device. In an embodiment, program 122 correlates the current version with the end-of-life support date of each piece of software on the first user computing device. In an embodiment, program 122 identifies a current version of each piece of middleware on the first user computing device using the data gathered from the first user computing device. In an embodiment, program 122 identifies an end-of-life support date of each piece of middleware on the first user computing device using the data gathered from the first user computing device. In an embodiment, program 122 correlates the current version with the end-of-life support date of each piece of middleware on the first user computing device.

In an embodiment, program 122 maps an environment of the first user computing device. In an embodiment, program 122 maps an environment of the first user computing device to help identify the current version of each piece of hardware, software, and/or middleware on the first user computing device.

In an embodiment, program 122 determines whether one or more collective combinational correlations exist between the hardware, software, and middleware of the first user computing device. In an embodiment, program 122 determines whether one or more collective combinational correlations exist between the hardware, software, and middleware of the first user computing device by identifying two or more pieces of hardware, software, and middleware on the first user computing device that may have a different end-of-life support date because of a unique usage of a combination of the two or more pieces of hardware, software, and middleware.

For example, program 122 identifies that user A has hardware X and software Y installed on user A's user computing device. Program 122 identifies the current version of hardware X and software Y installed on user A's user computing device. Program 122 identifies the end-of-life support date of hardware X and software Y installed on user A's user computing device. Program 122 questions whether a collective combinational correlation exists between hardware X and software Y (i.e., a specific combination of hardware and software) when combined and used concurrently on user A's user computing device. Program 122 determines that, because of the collective combinational correlation that exists between hardware X and software Y, when hardware X and software Y are run on the same user computing device, the end-of-life support date changes. That means, after the end-of-life support date, software Y cannot be run on hardware X.

In decision step 220, program 122 determines whether the user has triggered program 122 proactively. In an embodiment, responsive to identifying a current version of each piece of hardware, software, and/or middleware on the first user computing device using the data gathered from the first user computing device, program 122 determines whether the user has triggered program 122 proactively. In an embodiment, program 122 determines whether the user triggered program 122 proactively based on whether the user input a request to search for an upgrade, a migration, and/or a patch for the first user computing device. If program 122 determines the user triggered program 122 proactively (decision step 220, YES branch), then program 122 proceeds to step 260, enabling the user to input a specific query. If program 122 determines the user did not trigger program 122 proactively (decision step 220, NO branch), then program 122 proceeds to step 225, monitoring an upgrade repository.

In step 225, responsive to monitoring an upgrade repository, program 122 detects an upgrade is available for a piece of hardware, a piece of software, a piece of middleware, and/or a network of the first user computing device. A piece of hardware, a piece of software, a piece of middleware, and/or a network of the first user computing device will hereinafter be referred to as "a system and/or network" of the first user computing device. In another embodiment, responsive to monitoring a migration repository, program 122 detects a migration is available for a system and/or network of the first user computing device. In another embodiment, responsive to monitoring a patch repository, program 122 detects a patch is available for a system and/or network of the first user computing device. A patch is a set of changes to a software program or its supporting data designed to update, fix, or improve the software program. This includes fixing security vulnerabilities and other bugs. A patch is often written to improve the functionality, usability, or performance of the software program. In an embodiment, program 122 captures one or more requirements of the upgrade available for the system and/or network of the first user computing device from the upgrade repository.

In step 230, program 122 gathers a set of live data from an environment of the first user computing device using a process mining software. In an embodiment, responsive to detecting an upgrade is available for a piece of hardware, a piece of software, a piece of middleware, and/or a network of the first user computing device, program 122 gathers a set of live data from an environment of the first user computing device using a process mining software. In an embodiment, program 122 compares the set of live data from the environment of the first user computing device to a set of historical data stored in the knowledge corpus (e.g., database 124). The set of historical data stored in the knowledge corpus may include, but is not limited to, a plurality of historical systems and/or network logs from one or more user computing devices that have already completed the upgrade, migration, and/or patch that is available for the system and/or network of the first user computing device. In an embodiment, program 122 compares the set of live data from the environment of the first user computing device to the set of historical data stored in the knowledge corpus to identify a second user computing device similar to the first user computing device in terms of one or more factors. The one or more factors may include, but are not limited to, a similar type of hardware, a similar type of software, a similar type of middleware, a similar amount of memory unit in a storage unit, a similar processing ability, and a similar size.

In step 235, responsive to identifying a second user computing device similar to the first user computing device in terms of one or more factors, program 122 performs a pattern recognition between the set of live data from the environment of the first user computing device and the set of historical data stored in the knowledge corpus. In an embodiment, program 122 performs a pattern recognition between the set of live data from the environment of the first user computing device and the set of historical data stored in the knowledge corpus to generate one or more critical recommendations for a user to know when performing the upgrade for the system and/or network of the first user computing device. The one or more critical recommendations are stored in a knowledge corpus (e.g., database 124). In an embodiment, program 122 performs a pattern recognition with historical systems and/or network logs from one or more user computing devices that had positive experiences and negative experiences while completing the upgrade, migration, and/or patch that is available for the system and/or network of the first user computing device. Performing a pattern recognition with historical systems and/or network logs from one or more user computing devices that had positive experiences and negative experiences will permit program 122 to convey multiple points of a chronological progression at various timings and through various approaches. Performing a pattern recognition with historical systems and/or network logs from one or more user computing devices that had positive experiences and negative experiences will also permit program 122 to gather temporal data related to, but not limited to, a minimum amount of time to upgrade the system and/or network, an average time to upgrade the system and/or network, a mean time to upgrade the system and/or network, and a maximum time to upgrade the system and/or network.

In an embodiment, program 122 generates a predicted metric of downtime based on the results of the pattern recognition. Downtime refers to a period of time when a system cannot complete its primary function. Depending on the situation, the system may be temporarily unavailable, offline, or completely unable to operate. Downtime may also apply to a single application, computer, server, or entire network.

In an embodiment, program 122 generates a list of risk factors associated with not upgrading the system and/or network of the first user computing device. In an embodiment, program 122 generates a list of risk factors associated with not upgrading the system and/or network of the first user computing device so that the user may understand the risk the user is introducing into the system management equation if the user fails to upgrade the system and/or network of the first user computing device at a specific time, at a specific location, or at a specific part of the process.

The one or more critical recommendations may include, but are not limited to, an explanation of the performance of the system of the first user computing device; a recommended time when the system of the first user computing device should be upgraded, wherein the recommended time is based on the predicted metric of downtime; a recommended timeline that should be followed when the system of the first user computing device is upgraded; and the list of risk factors associated with not upgrading the system of the first user computing device at a specific time, at a specific location, or at a specific part of the process.

In step 240, program 122 monitors a flow of traffic through the system and/or network of the first user computing device. In an embodiment, responsive to performing a pattern recognition between the set of live data from the environment of the first user computing device and the set of historical data stored in the knowledge corpus, program 122 monitors a flow of traffic through the system and/or network of the first user computing device. In an embodiment, program 122 monitors a flow of traffic through the system and/or network of the first user computing device to determine whether the flow of traffic through the system and/or network of the first user computing device is at a higher risk of failure than expected (e.g., at a higher risk of running an unsupported version of hardware and software or at a higher risk of experiencing a possible outage, a financial impact, and/or an extended period of recovery).

In step 245, responsive to determining the flow of traffic through the system and/or network of the first user computing device is at a higher risk than expected, program 122 sends an alert notification to the user. In an embodiment, program 122 sends an alert notification to the user through user interface 132 of user computing device 130. In an embodiment, program 122 sends an alert notification to the user, notifying the user of the need to upgrade the system and/or the network of the first user computing device. In an embodiment, program 122 sends an alert notification to the user with the one or more critical recommendations (e.g., an explanation of the performance of the system of the first user computing device; a recommended time when the system of the first user computing device should be upgraded; a recommended timeline that should be followed when the system of the first user computing device is upgraded; and the list of risk factors associated with not upgrading the system of the first user computing device at a specific time, at a specific location, or at a specific part of the process). In an embodiment, program 122 sends an alert notification to the user with one or more benefits of upgrading the system and/or network of the first user computing device. In an embodiment, program 122 sends an alert notification to the user with one or more options for when and how to upgrade the system and/or network of the first user computing device.

For example, program 122 sends an alert notification to the user, recommending the user upgrade five items on the user computing device. The alert notification explains the five items recommended to be upgraded include two pieces of hardware, two pieces of software, and one piece of middleware. The alert notification also explains a recommended timeline that should be followed when upgrading the five items on the user computing device. More specifically, program 122 recommends, in step 1, that the user upgrade hardware system AB; in step 2, upgrade software for support system AB; in step 3, upgrade the object request broker (ORB) middleware for PI management platforms, API gateways, and API developer portals; in step 4, upgrade hardware system CD; in step 5, upgrade software for supporting system CD; in step 6, conduct a final data migration; and in step 7, qualify the solution with final user acceptance and data verification.

In step 250, program 122 schedules the upgrade for the system and/or network of the first user computing device during a period of time. In an embodiment, responsive to sending an alert notification to the user, program 122 schedules the upgrade for the system and/or network of the first user computing device during a period of time. The period of time is scheduled consistent with the one or more critical recommendations. In an embodiment, program 122 integrates the scheduled upgrade with deployment and code patching software (i.e., integrates the scheduled upgrade with an existing system to schedule the upgrade with the system's deployment tools, vendor software repositories, and project management tools for communication). The upgrade of the system and/or network of the first user computing device may be done by the user proactively or may be done by program 122 automatically during the scheduled period of time. In an embodiment, program 122 enables the user to provide input on when and how to upgrade the system and/or network of the first user computing device through user interface 132 of user computing device 130.

In step 255, program 122 requests feedback from the user. In an embodiment, responsive to scheduling the upgrade for the system and/or network of the first user computing device during a period of time, program 122 requests feedback from the user. In an embodiment, program 122 requests feedback from the user through user interface 132 of user computing device 130. In an embodiment, program 122 requests feedback from the user regarding the upgrade of the system and/or network of the first user computing device. In an embodiment, program 122 enables the user to input feedback. In an embodiment, program 122 enables the user to input feedback through user interface 132 of user computing device 130. The feedback input by the user may include, but is not limited to, both positive and negative feedback regarding an experience had while upgrading the system and/or network of the first user computing device as well as successes and failures of the upgrade of the system and/or network of the first user computing device. In an embodiment, program 122 gathers feedback from the user computing device (e.g., user computing device 130). The feedback gathered from the user computing device may include, but is not limited to, chronological dates as well as successes and failures of the plan to upgrade of the system and/or network of the first user computing device.

In an embodiment, program 122 processes the feedback provided by the user and gathered from the user computing device. In an embodiment, program 122 analyzes the relevancy of the feedback. In an embodiment, program 122 applies the feedback determined as relevant to improve program 122 using a recommendation system. The recommendation system used may be, but is not limited to, reinforcement learning, machine learning, collaborative filtering, matrix decomposition, clustering, and/or any deep learning approach. In an embodiment, program 122 stores the feedback in the knowledge corpus (e.g., database 124). The feedback stored in the knowledge corpus may be used as a reference resource and as an enabling resource (i.e., enabling intelligent workflows within the process) during future iterations of program 122.

In an embodiment, program 122 enables the user to input a what-if type of scenario. In an embodiment, program 122 enables the user to input a what-if type of scenario through user interface 132 of user computing device 130. In an embodiment, program 122 processes the what-if type of scenario to identify one or more changing variables. In an embodiment, program 122 learns a logical progression of upgrades from the what-if type of scenario. Understanding the logical progression of upgrades and being more or less aggressive with the upgrades is a form of iterative feedback. In an embodiment, program 122 stores the iterative feedback in the knowledge corpus (e.g., database 124). The feedback stored in the knowledge corpus may be used as a reference resource and as an enabling resource (i.e., enabling intelligent workflows within the process) during future iterations of program 122. For example, from the what-if type of scenario input by the user, program 122 determines whether some various point level upgrades for a software would be more beneficial than an entirely new operating system (OS) full release of the software. In an embodiment, program 122 learns the logical progression of the upgrades that should occur.

Returning to decision step 220, program 122 determines whether the user has triggered program 122 proactively. If program 122 determines the user triggered program 122 proactively (decision step 220, YES branch), then program 122 proceeds to step 260, enabling the user to input a specific query. In step 260, program 122 enables the user to input a specific query. The specific query may be, but is not limited to, asking for specific assistance to upgrade a unique element within an overall ecosystem and asking for details about the unique element within the overall ecosystem in order for the user to understand the pros, cons, dependencies, and/or other information relevant to the user's particular situation.

After completing step 260, program 122 proceeds to step 230, gathering a set of live data from an environment of the first user computing device using a process mining software; to step 235, performing a pattern recognition between the set of live data from the environment of the first user computing device and the set of historical data stored in the knowledge corpus; to step 240, monitoring a flow of traffic through the system and/or network of the first user computing device; and to step 245, sending an alert notification to the user. Steps 230, 235, and 240 are identical to steps 230, 235, and 240 set forth above. Step 245, however, differs from step 245 set forth above. Responsive to the user triggering program 122 proactively, program 122 sends an alert notification to the user. In an embodiment, program 122 sends an alert notification to the user through user interface 132 of user computing device 130. In an embodiment, program 122 sends an alert notification to the user, notifying the user of a recommendation in response to the specific query inputted. The recommendation is a highly unique, specialized, and targeted recommendation addressing the specific query inputted by the user.

In an example of the entire process flow of FIG. 2, customer A is running software B as a traditional on-prem deployment. Support for version 5 of software B will cease on Apr. 30, 2022. Although the decision to have version 5 of software B go end-of-support was announced on Sep. 8, 2020, customer A missed the announcement letter. Consequently, customer A did not plan appropriately to migrate software B. Months after the announcement, customer A finds the announcement letter. Customer A believes that customer A still has an optimal amount of time to complete the migration. Customer A plans to migrate the assets from software B to software C at a later date. Customer A's plans, however, place customer A at risk for running an unsupported version of software B and at risk for possible outages. If either occurs, customer A may become dissatisfied with the company that operates software B. This would place the company's in-flight sales opportunities at risk. Customer A installs program 122 on customer A's local system via software. During the set-up process, program 122 defined customer A's scope of use of customer A's user computing device. For example, program 122 inquired about customer A's application of software B to determine the number of APIs published, the numbers of developers subscribed, and the number of applications subscribed. As customer A runs program 122, program 122 gathers a set of live data from software B on customer A's user computing device using a process mining software. Program 122 then compares the set of live data from software B to a set of historical data stored in a knowledge corpus to identify a second user computing device similar to customer A's user computing device. Program 122 sends an alert notification to customer A, notifying customer A of the need to upgrade software B the first user computing device. Program 122 sends one or more critical recommendations to customer A. The one or more critical recommendations includes an explanation of the performance of software B on customer A's user computing device; one or more ways the performance of customer A's user computing device will improve when software B is upgraded to software C; one or more new features of software C; one or more examples of positive and negative feedback from customer clients, surveys, and experiences pertaining to the upgrade experience of software C, regardless of it being observed or collected within a system, method, or personal feedback from individuals working pervious upgrades; a recommended time when software B on customer A's user computing device should be upgraded; a recommended timeline that should be followed when software B on customer A's user computing device is upgraded; and the list of risk factors associated with not upgrading software B on customer A's user computing device at a specific time, at a specific location, or at a specific part of the process. Program 122 explains three reasons why customer A should upgrade from software B to software C during the scheduled period of time. First, if customer A upgrades from software B to software C, customer A would likely see an increase in performance because of improvements in a gateway functionality. Second, the upgrade from software B to software C is anticipated to take about six months based on the volume of APIs implemented and applications subscribed. The upgrade from software B to software C will also require the gateways to upgrade firmware levels prior to the upgrade from software B to software C. Third, the impact of not upgrading from software B to software C is great. If customer A does not upgrade, program 122 predicts possible outages as well as possible risk of exposure, financial impacts, and extended periods of recovery. Program 122 provides customer A with insight on the scale of the impact. For example, if customer A does not upgrade from software B to software C, customer A's decision could result in two hundred developers losing subscriptions to their APIs, which would ultimately result in a projected loss of two million dollars. Program 122 evaluates which areas of customer A's business and which roles are most impacted by the upgrade from software B to software C. Program 122 finds an infrastructure administrator will be impacted by the end-of-support date, whereas an API developer will see improved performance from the improved functionality of software C. After the migration from software B to software C is completed, program 122 requests feedback from customer A in order to improve the accuracy of recommendations with customer A's feedback and with the expansion of additional implementations and data points.

Figure 3:
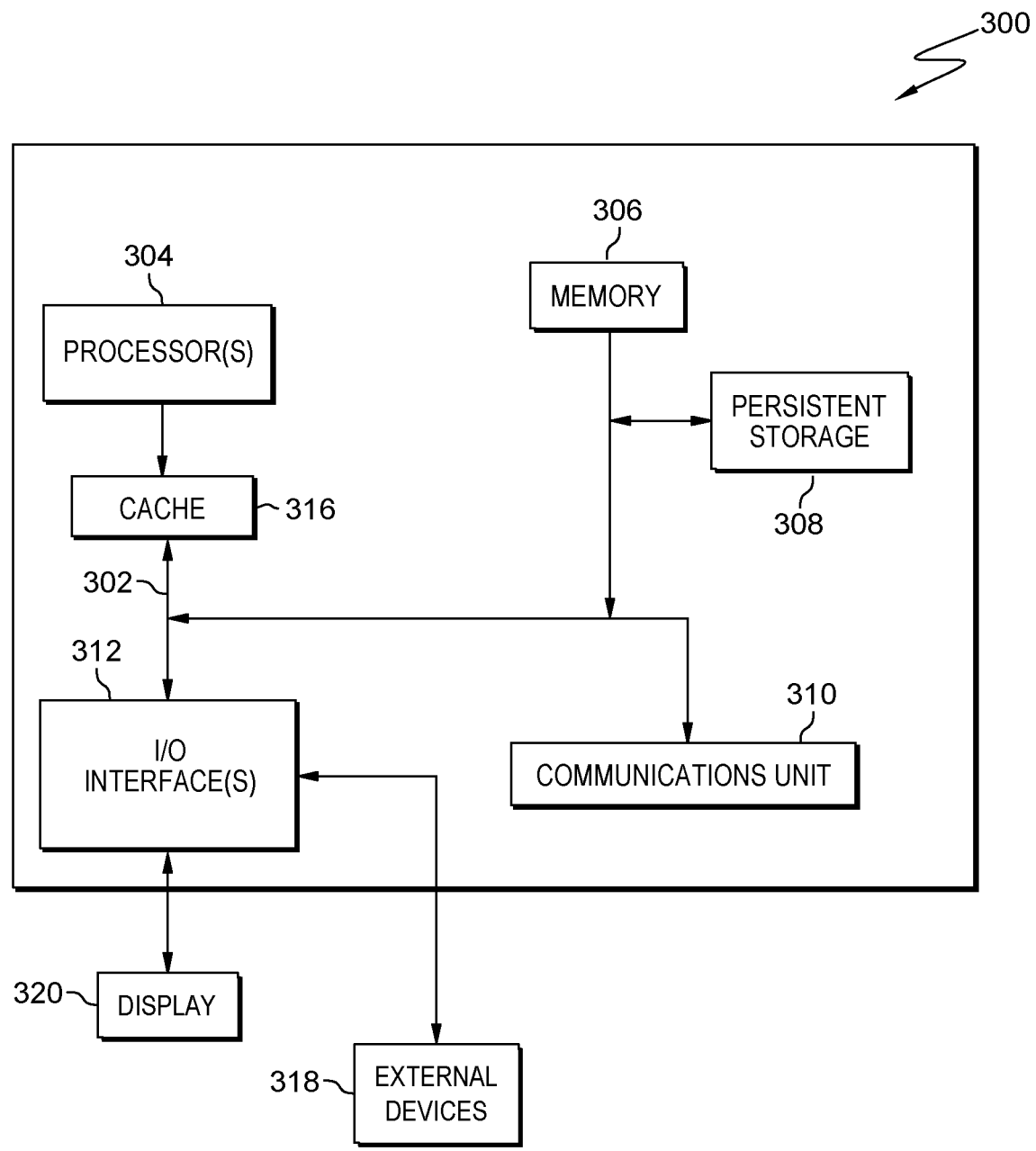
FIG. 3 is a block diagram illustrating the components of the server within the distributed data processing environment of FIG. 1, in accordance with an embodiment of the present invention.

FIG. 3 is a block diagram illustrating the components of server 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made. Computing device 300 includes processor(s) 304, memory 306, cache 316, communications fabric 302, persistent storage 308, input/output (I/O) interface(s) 312, and communications unit 310. Communications fabric 302 provides communications between memory 306, cache 316, persistent storage 308, input/output (I/O) interface(s) 312, and communications unit 310. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a cross switch. Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Program instructions and data (e.g., software and data) used to practice embodiments of the present invention may be stored in persistent storage 308 and in memory 306 for execution by one or more of the respective processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308. Software and data can be stored in persistent storage 308 for access and/or execution by one or more of the respective processor(s) 304 via cache 316. With respect to user computing device 130, software and data includes user interface 132. With respect to server 120, software and data includes program 122.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data (e.g., software and data)

used to practice embodiments of the present invention may be downloaded to persistent storage 308 through communications unit 310.

I/O interface(s) 312 allows for input and output of data with other devices that may be connected to each computer system. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Program instructions and data (e.g., software and data) used to practice embodiments of the present invention can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    detecting, by one or more processors, an upgrade is available for a system of a first user computing device;
    gathering, by the one or more processors, a set of live data from an environment of the first user computing device using a process mining software;
    comparing, by the one or more processors, the set of live data from the environment of the first user computing device to a set of historical data stored in a knowledge corpus to identify a second user computing device similar to the first user computing device in terms of one or more factors;
    responsive to identifying the second user computing device, performing, by the one or more processors, a pattern recognition between the set of live data from the environment of the first user computing device and the set of historical data stored in the knowledge corpus to generate one or more critical recommendations associated with the upgrade for the system of the first user computing device;
    determining, by the one or more processors, if a flow of traffic on the system of the first user computing device is at a higher risk of failure;
    responsive to determining the flow of traffic through the system of the first user computing device is at the higher risk of failure, sending, by the one or more processors, an alert notification with the one or more critical recommendations to a user; and
    scheduling, by the one or more processors, the upgrade for the system of the first user computing device during a period of time, wherein the period of time is scheduled consistent with the one or more critical recommendations.

2. The computer-implemented method of claim 1, further comprising:
    prior to detecting the upgrade is available for the system of the first user computing device, gathering, by the one or more processors, a set of data about a state of the first user computing device;
    identifying, by the one or more processors, a version of the system of the first user computing device;
    identifying, by the one or more processors, an end-of-life support date of the system of the first user computing device; and
    correlating, by the one or more processors, the version of the system of the first user computing device with the end-of-life support date of the system of the first user computing device.

3. The computer-implemented method of claim 2, wherein the set of data gathered from the first user computing device includes an identifying name of the first user computing device; a physical location of the first user computing device; an IP address for a network adapter of the first user computing device; a version of an operating system on the first user computing device; a version of a service pack on the first user computing device; a version of a hotfix on the first user computing device; a domain membership on the first user computing device; a type of hardware on the first user computing device; a role of the hardware; a type of software on the first user computing device; a role of the software; a type of middleware on the first user computing device; a role of the middleware; a type of network on the first user computing device; a role of the network; a set of upgrade processing data; a set of upgrade timing and duration data; a set of end-of-life support data; a set of data based on a usage, an interaction, and/or a dependency of the first user computing device; and a set of other critical behavior data.

4. The computer-implemented method of claim 1, wherein the set of historical data contains a plurality of historical system logs from one or more user computing devices that have already completed the upgrade that is available for the system of the first user computing device.

5. The computer-implemented method of claim 1, wherein the one or more factors include a similar type of hardware, a similar type of software, a similar type of middleware, a similar amount of memory unit in a storage unit, a similar processing ability, and a similar size.

6. The computer-implemented method of claim 1, wherein performing the pattern recognition between the set of live data from the environment of the first user computing device and the set of historical data stored in the knowledge corpus to generate the one or more critical recommendations associated with the upgrade for the system of the first user computing device further comprises:
gathering, by the one or more processors, temporal data related to a minimum amount of time to upgrade the system, an average time to upgrade the system, a mean time to upgrade the system, and a maximum time to upgrade the system;
generating, by the one or more processors, a predicted metric of downtime based on a result of the pattern recognition; and
generating, by the one or more processors, a list of risk factors associated with not upgrading the system of the first user computing device at a specific time or at a specific location.

7. The computer-implemented method of claim 1, wherein the one or more critical recommendations include an explanation of performance of the system of the first user computing device; a recommended time when the system of the first user computing device should be upgraded, wherein the recommended time is based on a predicted metric of downtime; a recommended timeline that should be followed when the system of the first user computing device is upgraded; and a list of risk factors associated with not upgrading the system of the first user computing device at a specific time or at a specific location.

8. The computer-implemented method of claim 1, further comprising:
enabling, by the one or more processors, the user to input a what-if type of scenario;
processing, by the one or more processors, the what-if type of scenario to identify one or more changing variables; and
learning, by the one or more processors, a logical progression of upgrades from the what-if type of scenario.

9. A computer program product comprising:
one or more computer readable storage media and program instructions stored on the one or more computer readable storage media, the program instructions comprising:
program instructions to detect an upgrade is available for a system of a first user computing device;
program instructions to gather a set of live data from an environment of the first user computing device using a process mining software;
program instructions to compare the set of live data from the environment of the first user computing device to a set of historical data stored in a knowledge corpus to identify a second user computing device similar to the first user computing device in terms of one or more factors;
responsive to identifying the second user computing device, program instructions to perform a pattern recognition between the set of live data from the environment of the first user computing device and the set of historical data stored in the knowledge corpus to generate one or more critical recommendations associated with the upgrade for the system of the first user computing device;
program instructions to determine if a flow of traffic on the system of the first user computing device is at a higher risk of failure;
responsive to determining the flow of traffic through the system of the first user computing device is at the higher risk of failure, program instructions to send an alert notification with the one or more critical recommendations to a user; and
program instructions to schedule the upgrade for the system of the first user computing device during a period of time, wherein the period of time is scheduled consistent with the one or more critical recommendations.

10. The computer program product of claim 9, further comprising:
prior to detecting the upgrade is available for the system of the first user computing device, program instructions to gather a set of data about a state of the first user computing device;
program instructions to identify a version of the system of the first user computing device;
program instructions to identify an end-of-life support date of the system of the first user computing device; and
program instructions to correlate the version of the system of the first user computing device with the end-of-life support date of the system of the first user computing device.

11. The computer program product of claim 9, wherein the one or more factors include a similar type of hardware, a similar type of software, a similar type of middleware, a similar amount of memory unit in a storage unit, a similar processing ability, and a similar size.

12. The computer program product of claim 9, wherein performing the pattern recognition between the set of live data from the environment of the first user computing device and the set of historical data stored in the knowledge corpus to generate the one or more critical recommendations associated with the upgrade for the system of the first user computing device further comprises:
program instructions to gather temporal data related to a minimum amount of time to upgrade the system, an average time to upgrade the system, a mean time to upgrade the system, and a maximum time to upgrade the system;
program instructions to generate a predicted metric of downtime based on a result of the pattern recognition; and
program instructions to generate a list of risk factors associated with not upgrading the system of the first user computing device at a specific time or at a specific location.

13. The computer program product of claim 9, wherein the one or more critical recommendations include an explanation of performance of the system of the first user computing device; a recommended time when the system of the first user computing device should be upgraded, wherein the recommended time is based on a predicted metric of downtime; a recommended timeline that should be followed when the system of the first user computing device is upgraded; and a list of risk factors associated with not upgrading the system of the first user computing device at a specific time or at a specific location.

14. The computer program product of claim 9, further comprising:
program instructions to enable the user to input a what-if type of scenario;
program instructions to process the what-if type of scenario to identify one or more changing variables; and
program instructions to learn a logical progression of upgrades from the what-if type of scenario.

15. A computer system comprising:
one or more computer processors;
one or more computer readable storage media;
program instructions collectively stored on the one or more computer readable storage media for execution by at least one of the one or more computer processors, the stored program instructions comprising:
program instructions to detect an upgrade is available for a system of a first user computing device;
program instructions to gather a set of live data from an environment of the first user computing device using a process mining software;
program instructions to compare the set of live data from the environment of the first user computing device to a set of historical data stored in a knowledge corpus to identify a second user computing device similar to the first user computing device in terms of one or more factors;
responsive to identifying the second user computing device, program instructions to perform a pattern recognition between the set of live data from the environment of the first user computing device and the set of historical data stored in the knowledge corpus to generate one or more critical recommendations associated with the upgrade for the system of the first user computing device;
program instructions to determine if a flow of traffic on the system of the first user computing device is at a higher risk of failure;
responsive to determining the flow of traffic through the system of the first user computing device is at the higher risk of failure, program instructions to send an alert notification with the one or more critical recommendations to a user; and
program instructions to schedule the upgrade for the system of the first user computing device during a period of time, wherein the period of time is scheduled consistent with the one or more critical recommendations.

16. The computer system of claim 15, further comprising:
prior to detecting the upgrade is available for the system of the first user computing device, program instructions to gather a set of data about a state of the first user computing device;
program instructions to identify a version of the system of the first user computing device;
program instructions to identify an end-of-life support date of the system of the first user computing device; and
program instructions to correlate the version of the system of the first user computing device with the end-of-life support date of the system of the first user computing device.

17. The computer system of claim 15, wherein the one or more factors include a similar type of hardware, a similar type of software, a similar type of middleware, a similar amount of memory unit in a storage unit, a similar processing ability, and a similar size.

18. The computer system of claim 15, wherein performing the pattern recognition between the set of live data from the environment of the first user computing device and the set of historical data stored in the knowledge corpus to generate the one or more critical recommendations associated with the upgrade for the system of the first user computing device further comprises:
program instructions to gather temporal data related to a minimum amount of time to upgrade the system, an average time to upgrade the system, a mean time to upgrade the system, and a maximum time to upgrade the system;
program instructions to generate a predicted metric of downtime based on a result of the pattern recognition; and
program instructions to generate a list of risk factors associated with not upgrading the system of the first user computing device at a specific time or at a specific location.

19. The computer system of claim 15, wherein the one or more critical recommendations include an explanation of performance of the system of the first user computing device; a recommended time when the system of the first user computing device should be upgraded, wherein the recommended time is based on a predicted metric of downtime; a recommended timeline that should be followed when the system of the first user computing device is upgraded; and a list of risk factors associated with not upgrading the system of the first user computing device at a specific time or at a specific location.

20. The computer system of claim 15, further comprising:
program instructions to enable the user to input a what-if type of scenario;
program instructions to process the what-if type of scenario to identify one or more changing variables; and
program instructions to learn a logical progression of upgrades from the what-if type of scenario.

* * * * *